US009467560B2

(12) United States Patent
Geldenbott et al.

(10) Patent No.: US 9,467,560 B2
(45) Date of Patent: *Oct. 11, 2016

(54) END-TO-END LOGIC TRACING OF COMPLEX CALL FLOWS IN A DISTRIBUTED CALL SYSTEM

(71) Applicant: TeleCommunication Systems, Inc., Annapolis, MD (US)

(72) Inventors: Gerhard Geldenbott, Seattle, WA (US); Gordon J. Hines, Kirkland, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,773

(22) Filed: Apr. 28, 2015

(65) Prior Publication Data

US 2015/0237200 A1 Aug. 20, 2015

Related U.S. Application Data

(63) Continuation of application No. 14/071,342, filed on Nov. 4, 2013, now Pat. No. 9,042,522, which is a continuation of application No. 12/081,191, filed on Apr. 11, 2008, now Pat. No. 8,576,991.

(60) Provisional application No. 61/064,671, filed on Mar. 19, 2008.

(51) Int. Cl.
*H04M 11/04* (2006.01)
*H04M 3/36* (2006.01)
*H04M 3/22* (2006.01)

(52) U.S. Cl.
CPC ............. *H04M 3/36* (2013.01); *H04M 3/2281* (2013.01); *H04M 11/04* (2013.01)

(58) Field of Classification Search
USPC ......................................................... 379/45
See application file for complete search history.

(56) References Cited

U.S. PATENT DOCUMENTS

| 1,103,073 A | 7/1914 | O'Connel |
| 4,445,118 A | 4/1984 | Taylor et al. |

(Continued)

FOREIGN PATENT DOCUMENTS

| WO | WO01/45342 | 6/2001 |
| WO | WO2004/025941 | 3/2004 |

OTHER PUBLICATIONS

PCT International Search Report in PCT/US2009/01640 dated Jul. 26, 2010.

(Continued)

*Primary Examiner* — Maria El-Zoobi
(74) *Attorney, Agent, or Firm* — Tarolli, Sundheim, Covell & Tummino LLP

(57) ABSTRACT

A logic history can be provided for every request or call instance through a distributed computing system that uniquely traces its entire path, end-to-end, in-band within the messaging for the system. The end result is a single true representation of what occurred with no post computational inference. Accordingly, unique logic history codes are not forced across the system. Rather sub-components that are logic history enabled can use codes that have meaning and applicability to itself. Unique logic history codes are not forced across the system, which in practice would be brittle. Rather each sub-component that is logic history enabled can use codes that have meaning and applicability only to itself. This allows the system to be flexible and lets sub-components change and redefine their logic and logic history traces without impacting the rest of the system.

13 Claims, 3 Drawing Sheets

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,868,570 A | 9/1989 | Davis |
| 4,891,638 A | 1/1990 | Davis |
| 4,891,650 A | 1/1990 | Scheffer |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,166,972 A | 11/1992 | Smith |
| 6,032,051 A | 2/2000 | Hall |
| 6,108,533 A | 8/2000 | Brohoff |
| 6,134,316 A | 10/2000 | Kallioniemi |
| 6,181,939 B1 | 1/2001 | Ahvenainen |
| 6,253,074 B1 | 6/2001 | Carlsson |
| 6,278,701 B1 | 8/2001 | Ayyagari |
| 6,304,635 B1 * | 10/2001 | Iwami ............ H04M 3/36 379/112.05 |
| 6,321,092 B1 | 11/2001 | Fitch |
| 6,360,102 B1 | 3/2002 | Havinis |
| 6,397,208 B1 | 5/2002 | Lee |
| 6,427,001 B1 | 7/2002 | Contractor |
| 6,526,026 B1 | 2/2003 | Menon |
| 6,529,500 B1 | 3/2003 | Pandharipande |
| 6,564,261 B1 | 5/2003 | Gudjonsson |
| 6,587,691 B1 | 7/2003 | Granstam |
| 6,600,927 B2 | 7/2003 | Hamilton |
| 6,621,810 B1 | 9/2003 | Leung |
| 6,687,504 B1 | 2/2004 | Raith |
| 6,694,351 B1 | 2/2004 | Shaffer |
| 6,731,940 B1 | 5/2004 | Nagendran |
| 6,744,858 B1 | 6/2004 | Ryan |
| 6,771,629 B1 * | 8/2004 | Preston ............ H04B 7/2662 370/337 |
| 6,775,267 B1 | 8/2004 | Kung |
| 6,775,534 B2 | 8/2004 | Lindgren |
| 6,795,444 B1 | 9/2004 | Vo |
| 6,839,417 B2 | 1/2005 | Weisman |
| 6,847,618 B2 | 1/2005 | Laursen |
| 6,876,734 B1 | 4/2005 | Summers |
| 6,898,633 B1 | 5/2005 | Lyndersay |
| 6,912,230 B1 | 6/2005 | Salkini |
| 6,940,826 B1 | 9/2005 | Simard |
| 6,940,950 B2 | 9/2005 | Dickinson et al. |
| 6,957,068 B2 | 10/2005 | Hutchison |
| 6,968,044 B2 | 11/2005 | Beason |
| 6,985,747 B2 | 1/2006 | Chithambaram |
| 6,993,355 B1 | 1/2006 | Pershan |
| 7,072,667 B2 | 7/2006 | Olrik |
| 7,106,717 B2 | 9/2006 | Rousseau |
| 7,110,773 B1 | 9/2006 | Wallace |
| 7,136,466 B1 | 11/2006 | Gao |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,200,380 B2 | 4/2007 | Havlark |
| 7,245,900 B1 | 7/2007 | Lamb |
| 7,246,187 B1 | 7/2007 | Ezra |
| 7,260,186 B2 | 8/2007 | Zhu |
| 7,269,428 B1 | 9/2007 | Wallenius |
| 7,302,582 B2 | 11/2007 | Snapp |
| 7,321,773 B2 | 1/2008 | Hines |
| 7,330,899 B2 | 2/2008 | Wong |
| 7,369,508 B2 | 5/2008 | Parantainen |
| 7,369,530 B2 | 5/2008 | Keagy |
| 7,382,773 B2 | 6/2008 | Schoeneberger |
| 7,392,240 B2 | 6/2008 | Scriffignano |
| 7,394,896 B2 | 7/2008 | Norton |
| 7,403,939 B1 | 7/2008 | Virdy |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky |
| 7,440,565 B2 | 10/2008 | McLarty |
| 7,450,951 B2 | 11/2008 | Vimpari |
| 7,453,990 B2 | 11/2008 | Welenson |
| 7,495,608 B1 | 2/2009 | Chen |
| 7,516,210 B2 | 4/2009 | Liscano |
| 7,573,982 B2 | 8/2009 | Breen |
| 7,602,886 B1 | 10/2009 | Beech |
| 7,623,447 B1 | 11/2009 | Faccin |
| 7,711,094 B1 | 5/2010 | Olshansky |
| 7,747,258 B2 | 6/2010 | Farmer |
| 7,764,961 B2 | 7/2010 | Zhu |
| 7,783,297 B2 | 8/2010 | Ishii |
| 7,787,611 B1 | 8/2010 | Kotelly |
| 7,792,989 B2 | 9/2010 | Toebes |
| 7,881,233 B2 | 2/2011 | Bieselin |
| 7,890,122 B2 | 2/2011 | Walsh |
| 7,937,067 B2 | 5/2011 | Maier |
| 8,005,683 B2 | 8/2011 | Tessesl |
| 8,027,658 B2 | 9/2011 | Suryanarayana |
| RE42,927 E | 11/2011 | Want |
| 8,060,389 B2 | 11/2011 | Johnson |
| 8,308,570 B2 | 11/2012 | Fiedler |
| 8,422,487 B2 | 4/2013 | Mason |
| 8,600,923 B2 | 12/2013 | McColgan |
| 8,831,645 B2 | 9/2014 | Agarwal |
| 8,903,903 B2 | 12/2014 | Benedyk |
| 2001/0040886 A1 | 11/2001 | Jimenez |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086676 A1 | 7/2002 | Hendry |
| 2002/0101860 A1 | 8/2002 | Thornton |
| 2002/0102996 A1 | 8/2002 | Jenkins |
| 2002/0118650 A1 | 8/2002 | Jagadeesan |
| 2002/0123327 A1 | 9/2002 | Vataja |
| 2002/0126656 A1 | 9/2002 | Park |
| 2002/0158777 A1 | 10/2002 | Flick |
| 2002/0173317 A1 | 11/2002 | Nykanen |
| 2002/0191595 A1 | 12/2002 | Mar |
| 2003/0009277 A1 | 1/2003 | Fan |
| 2003/0012148 A1 | 1/2003 | Peters |
| 2003/0026245 A1 | 2/2003 | Ejzak |
| 2003/0044654 A1 | 3/2003 | Holt |
| 2003/0086539 A1 | 5/2003 | McCalmont |
| 2003/0108176 A1 | 6/2003 | Kung |
| 2003/0109245 A1 | 6/2003 | McCalmont |
| 2003/0118160 A1 | 6/2003 | Holt |
| 2003/0119521 A1 | 6/2003 | Tipnis |
| 2003/0119528 A1 | 6/2003 | Pew |
| 2003/0186709 A1 | 10/2003 | Rhodes |
| 2004/0043775 A1 | 3/2004 | Kennedy |
| 2004/0047461 A1 | 3/2004 | Weisman |
| 2004/0076277 A1 | 4/2004 | Kuusinen |
| 2004/0143852 A1 | 7/2004 | Meyers |
| 2004/0181689 A1 | 9/2004 | Kiyoto |
| 2004/0184584 A1 | 9/2004 | McCalmont |
| 2004/0190497 A1 | 9/2004 | Knox |
| 2004/0198386 A1 | 10/2004 | Dupray |
| 2004/0267445 A1 | 12/2004 | De Luca |
| 2005/0020242 A1 | 1/2005 | Holland |
| 2005/0043037 A1 | 2/2005 | Loppe |
| 2005/0053209 A1 | 3/2005 | D'Evelyn |
| 2005/0063519 A1 | 3/2005 | James |
| 2005/0074107 A1 | 4/2005 | Renner |
| 2005/0078612 A1 | 4/2005 | Lang |
| 2005/0083911 A1 | 4/2005 | Grabelsky |
| 2005/0838911 | 4/2005 | Grabelsky |
| 2005/0101335 A1 | 5/2005 | Kelly |
| 2005/0107673 A1 | 5/2005 | Ball |
| 2005/0119012 A1 | 6/2005 | Merheb |
| 2005/0125376 A1 | 6/2005 | Curtis |
| 2005/0135569 A1 | 6/2005 | Dickinson |
| 2005/0136885 A1 | 6/2005 | Kaltsukis |
| 2005/0169248 A1 | 8/2005 | Truesdale |
| 2005/0174991 A1 | 8/2005 | Keagy |

(56) References Cited

U.S. PATENT DOCUMENTS

| | | |
|---|---|---|
| 2005/0192822 A1 | 9/2005 | Hartenstein |
| 2005/0201529 A1 | 9/2005 | Nelson |
| 2005/0213716 A1 | 9/2005 | Zhu |
| 2005/0232252 A1 | 10/2005 | Hoover |
| 2005/0238156 A1 | 10/2005 | Turner |
| 2005/0255857 A1 | 11/2005 | Kim |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman |
| 2006/0010200 A1 | 1/2006 | Mousseau |
| 2006/0026288 A1 | 2/2006 | Acharya |
| 2006/0068753 A1 | 3/2006 | Karpen |
| 2006/0077911 A1 | 4/2006 | Shaffer |
| 2006/0079330 A1 | 4/2006 | Dvorak |
| 2006/0088152 A1 | 4/2006 | Green |
| 2006/0104306 A1 | 5/2006 | Adamczkk |
| 2006/0120517 A1 | 6/2006 | Moon |
| 2006/0128395 A1 | 6/2006 | Muhonen |
| 2006/0135177 A1 | 6/2006 | Winterbottom |
| 2006/0154710 A1 | 7/2006 | Serafat |
| 2006/0188083 A1 | 8/2006 | Breen |
| 2006/0239205 A1 | 10/2006 | Warren |
| 2006/0250987 A1 | 11/2006 | White |
| 2006/0258380 A1 | 11/2006 | Liebowitz |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0022011 A1 | 1/2007 | Altberg |
| 2007/0026871 A1 | 2/2007 | Wager |
| 2007/0027997 A1 | 2/2007 | Polk |
| 2007/0036139 A1 | 2/2007 | Patel |
| 2007/0041513 A1 | 2/2007 | Gende |
| 2007/0041516 A1 | 2/2007 | Dickinson |
| 2007/0049288 A1 | 3/2007 | Lamprecht |
| 2007/0060097 A1 | 3/2007 | Edge |
| 2007/0081635 A1 | 4/2007 | Croak |
| 2007/0121601 A1 | 5/2007 | Kikinis |
| 2007/0149213 A1 | 6/2007 | Lamba |
| 2007/0160036 A1 | 7/2007 | Smith |
| 2007/0162228 A1 | 7/2007 | Mitchell |
| 2007/0201623 A1 | 8/2007 | Hines |
| 2007/0206568 A1 | 9/2007 | Silver |
| 2007/0206613 A1 | 9/2007 | Silver |
| 2007/0242660 A1 | 10/2007 | Xu |
| 2007/0263610 A1 | 11/2007 | Mitchell |
| 2007/0270164 A1 | 11/2007 | Maier |
| 2008/0032703 A1 | 2/2008 | Krumm |
| 2008/0037715 A1 | 2/2008 | Prozeniuk |
| 2008/0059304 A1 | 3/2008 | Kimsey |
| 2008/0063153 A1 | 3/2008 | Krivorot |
| 2008/0065775 A1 | 3/2008 | Polk |
| 2008/0080691 A1 | 4/2008 | Dolan |
| 2008/0117859 A1 | 5/2008 | Shahidi |
| 2008/0146343 A1 | 6/2008 | Sullivan et al. |
| 2008/0186164 A1 | 8/2008 | Emigh |
| 2008/0214202 A1 | 9/2008 | Toomey |
| 2008/0249967 A1 | 10/2008 | Flinn |
| 2009/0076842 A1 | 3/2009 | Schwarzberg |
| 2009/0323636 A1 | 12/2009 | Dillon |
| 2010/0029244 A1 | 2/2010 | Moodbidri |
| 2010/0069034 A1 | 3/2010 | Dickinson |
| 2010/0119049 A1 | 5/2010 | Clark |
| 2010/0178973 A1 | 7/2010 | Snoddy et al. |
| 2010/0218664 A1 | 9/2010 | Toledano et al. |
| 2010/0328093 A1 | 12/2010 | Robinson et al. |
| 2011/0113060 A1 | 5/2011 | Martini |
| 2011/0149953 A1 | 6/2011 | Helgeson et al. |
| 2011/0273568 A1 | 11/2011 | Lagassey |
| 2012/0001750 A1 | 1/2012 | Monroe |
| 2012/0189107 A1 | 7/2012 | Dickinson |
| 2013/0072308 A1 | 3/2013 | Peck et al. |
| 2013/0079152 A1 | 3/2013 | Hall |

OTHER PUBLICATIONS

Intrado MSAG Prep for E911 Program and Documentation. Intrado Inc., Longmont, CO. Sep. 14, 2006. Accessed: Nov. 8, 2011. Idaho PSAP Standards Committee. Idaho Emergency Communications Commission,http://idahodispatch.com/index.php?option=com_documan&task=doc_download&gid=3&Itemid=7.

International Search Report received in PCT/US2012/000422 dated Dec. 10, 2012.

Extended European Search Report from EPO in European Appl. No. 06827172.5 dated Dec. 29, 2009.

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

Location Based Services V2 Roaming Support (non proprietary), 80-V8470-2NP A, dated Jan. 27, 2005, pp. 1-56.

International Search Report received in PCT/US11/01971 dated Feb. 28, 2013.

International Search Report received in PCT/US2011/001990 dated Apr. 24, 2012.

Yilin Zhao, Efficient and reliable date transmission for cellular and GPS based mayday systems, Nov. 1997, IEEE, IEEE Conference on Intelligent Transportation System, 1997. ITSC 97, 555-559.

\* cited by examiner

END-TO-END LOGIC TRACING OF COMPLEX CALL FLOWS IN A DISTRIBUTED CALL SYSTEM

RELATED APPLICATIONS

This application is a continuation of U.S. patent application Ser. No. 14/071,342, entitled "End-to-End Logic Tracing of Complex Call Flows in a Distributed Call System", filed on Nov. 4, 2011; which is a continuation of U.S. patent application Ser. No. 12/081,191, entitled "End-to-End Logic Tracing of Complex Call Flows in a Distributed Call System", filed on Apr. 11, 2008, now U.S. Pat. No. 8,576,991; which claims priority to U.S. Provisional Application No. 61/064,671, filed Mar. 19, 2008, entitled "End-to-End Logic Tracing of Complex Call Flows in a Distributed Call System." The entirety of all three of which are expressly incorporated herein by reference.

BACKGROUND OF THE INVENTION

1. Field of the Invention

This invention relates generally to any moderately complex software system. It is especially applicable to large scale, distributed systems, where it is mandatory to track down what logic was applied across multiple components in the system.

2. Background of Related Art

Distributed Emergency Call Systems in telecommunications are in general very complex computing systems. In the realm of emergency call systems in particular, un-interrupted service must be provided with each "request" being correctly processed within a well specified time interval. The latter requirement is often met by fallback logic that is invoked whenever one or more unexpected conditions occur. Typically, in Emergency Call Systems a request is a call instance placed by a person in distress. The terms "request", "call instance" and "transaction" are used herein to refer to an atomic transaction through a complex computing system.

Distributed systems exist that employ various implementations of tracing and logging that allow an operator to trace or follow a request throughout the system, e.g., to collect statistics or to trouble-shoot a particular problem. But in many cases just the exit criteria are collected, i.e., the end-result of a request but not how the request got to that point.

Telephony systems generally use Call Detail Records (CDRs), error logs, and Simple Network Management Protocol (SNMP) traps to gather what occurred on the system. Using conventional technology an adjunct system usually has to gather all the desired data and make a best attempt at correlating and reconstructing what most likely occurred by inference of the data gathered.

The present inventors have recognized that the existing technology for logic tracing of a complex call flow in a distributed system is dependent on gathering all applicable data, in a timely manner, and dependent on best attempts at gathering and correlating available data. Unfortunately, unless complete forethought is given before a given call is made, it is usually problematic to afterwards correlate call flow data relating to that call.

FIG. 3 shows a distributed computing system consisting of an exemplary four components, and use of conventional technology to collect a transaction history.

In particular, FIG. 3 shows a distributed computing system including (by way of example only) a front end component A 302, a core processing component B 304, a helper #1 component C 306, and a helper #2 component D 308. For fault tolerance purposes, any or all of the components 302, 304, 306, 308 may be multiple components themselves, as depicted by the shadowed boxes shown in FIG. 3.

To perform a logic tracing of a call flow, using conventional technology the data is collected, post-processed and correlated to get a view of what occurred for the transaction.

Using existing technologies, call data records (CDRs) 303, error logs 307, 309 and Simple Network Management Protocol (SNMP) traps are generated at the various components 302, 304, 306, 308 using disparate technologies. In general, the various logging pieces including call data records (CDRs) 303 are collected (preferably in a common format) and then stored in an appropriate transaction datastore 314.

In the example of FIG. 3, the identifier "Transaction XYZ" is used. As depicted in the reconstructed transaction flow 312, component A 302 generates CDRs for Transaction XYZ.

In the example Component B 304 uses SNMP traps, so Component B 304 generates SNMP traps for Transaction XYZ. In many cases, SNMP traps are only generated in the case of abnormal conditions.

Two helper Components C 306, D 308, write transaction details into respective logs 307, 309 (in the given example), so Components C and D 306, 308 generate system log messages for Transaction XYZ. The location and format of each of the system logs 307, 309 is system dependent. Similar to an SNMP trap, a system log is in general only used to record abnormal conditions.

With traditional systems and call flow tracing technology an operator must know what type transaction recording method each component in the complex system uses. With such knowledge beforehand, the operator will then gain access to each of the recording method's "storage" and then determine a way to correlate a particular transaction from end-to-end and based on information obtained from appropriate storage for each component 302, 304, 306, 308. Most likely a "transaction identifier" is used to perform this task. Once all those pieces are in hand, a best attempt at identifying the flow of a given transaction may be reconstructed as depicted at 312.

However, the inventors herein recognize that the quality of this reconstruction is a direct function of the amount of (or lack of thereof) the data logged by the system's respective components. Using conventional call flow logic tracing technology, once the relevant data has been gathered, it must be analyzed to reproduce the actual call. The resulting reproduction is in many cases, at best, only an approximation of the actual call flow.

There is a need for improved complex call flow tracing in a distributed call system.

BRIEF DESCRIPTION OF THE DRAWINGS

Features and advantages of the present invention will become apparent to those skilled in the art from the following description with reference to the drawings, in which.

SUMMARY OF THE INVENTION

Figure 1:
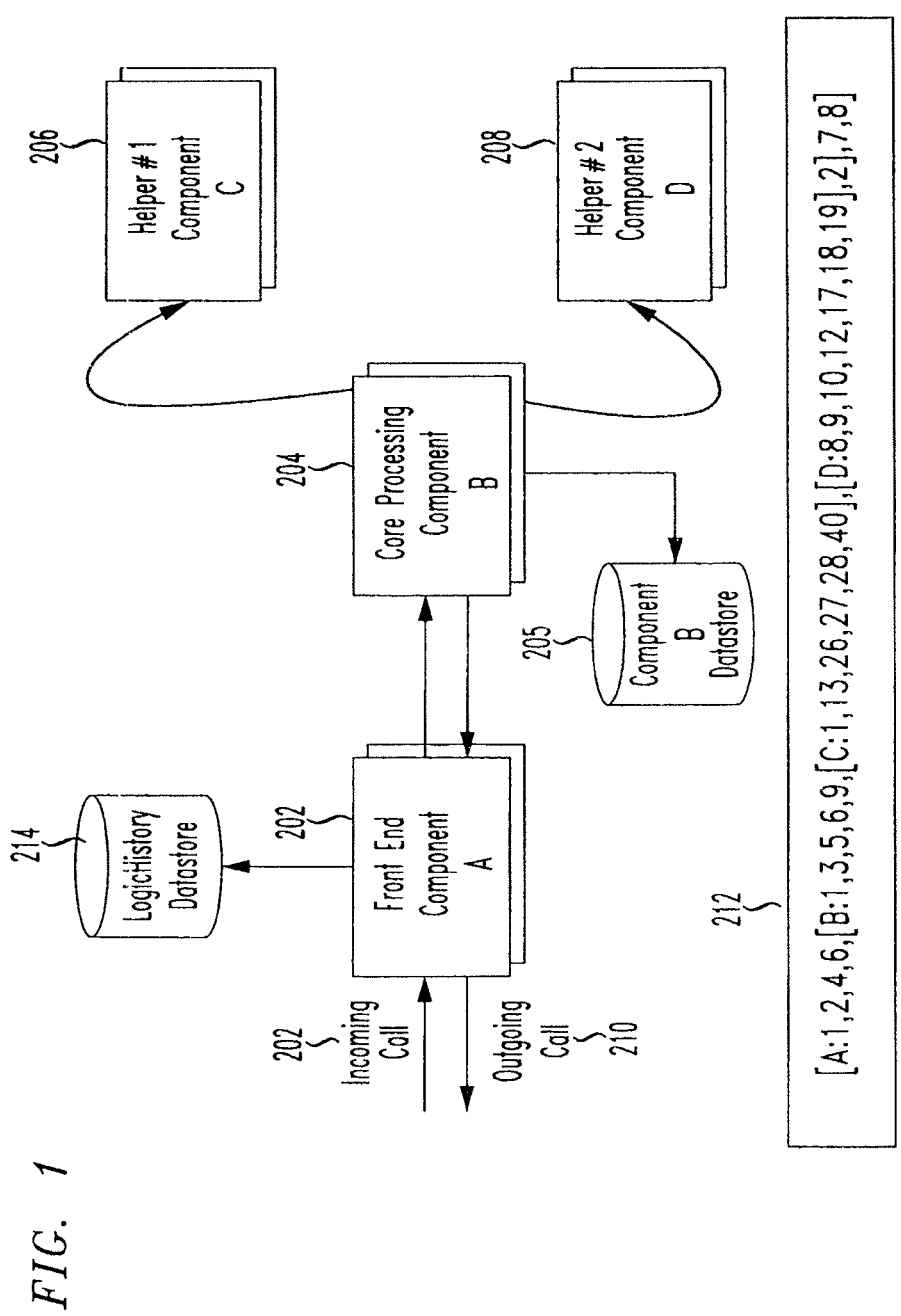
FIG. 1 shows an exemplary distributed computing system comprising four components, each embedding characters into an in-band logic history to collect a call flow transaction history, in accordance with the principles of the present invention.

In accordance with the principles of the present invention, an in-band call flow logic history is embedded in a logic history relating to a call request passed through a distributed call system. The in-band logic history comprises a first group of characters representing specific events in a logic flow of the call request relevant to a first component in the distributed call system, and a second group of characters representing specific events in the logic flow of the call request relevant to a second component in the distributed call system. The first group of characters and the second group of characters are retrieved in-band with the call request as the call request travels through the distributed call system.

In accordance with a method and apparatus according to the present invention, a method of embedding an end-to-end logic flow history in-band with a given call request comprises receiving a call request, and instantiating a logic history in-band relating to said call request. Characters representing a logic flow history are embedded into the in-band logic history. The call request is passed to another component in the distributed call system. A returned logic history string is received from the other component. The returned logic history string is embedded into the in-band logic history, and the logic history is stored in a suitable logic history database.

DETAILED DESCRIPTION OF ILLUSTRATIVE EMBODIMENTS

The present invention provides the ability to create an end-to-end in-band logic history for every request or call instance through a distributed computing system. Importantly, the created logic history uniquely traces each request's entire path, end-to-end, in-band within the messaging for the system. The end result is a single true representation of what occurred with no post computational inference.

The logic history creation performed in accordance with the principles of the present invention results in no measurable degradation to overall performance, and in general provides higher performance than otherwise conventional technique of logging and gathering the individual constituent parts and re-associating the data together. Thus, there is no longer the need for operational staff to correlate Call Detail Records (CDRs), error logs, SNMP traps etc. to gather what occurred in the system for a particular transaction of interest.

The inventors recognize that in critical systems such as a 911 emergency call system, it is very important to know what actually occurred in a particular emergency call, and not what may have occurred as is provided by conventional post-call inference technology. The invention provides a unique technique with the ability to track every logic decision point of a request, end-to-end, throughout a distributed call system. The inventive technique performs end-to-end logic tracing without the need for comparable overhead required by use of conventional tracing and logging mechanisms, and without any measurable effect on overall performance.

Many emergency call systems in telecommunications are implemented as distributed, fault tolerant systems. This invention provides the ability for a system operator or other interested and/or authorized party to uniquely trace the logic path through every sub-component in the distributed call system, and to gather the results of all components in the same hierarchical manner that the call instance used through the system. Thus the resulting logic trace shows the unique trace of the request through the system and is therefore referred to herein as a true and accurate "logic history".

Preferably the logic history is stored in a human readable informational style. The logic history may be graded and verified by automated processes as desired.

While described with respect to end-to-end logic tracing of complex call flows in a distributed call system, the invention ultimately has application to computing systems that deploy messaging, and/or distributed systems wherein knowledge of the exact path (i.e. logic) of a transaction is required.

FIG. 1 shows an exemplary distributed computing system comprising four components, each embedding characters into an in-band logic history to collect a call flow transaction history, in accordance with the principles of the present invention.

For fault tolerance purposes there may be one or more of each component 202, 204, 206, 208 as indicated by the shadowed boxes in FIG. 1.

As shown in the example system of FIG. 1, there is a front end component A 202 that handles the in and outbound flow of requests.

The exemplary system also includes a core processing component B 204. The core processing component B 204 preferably adds to a logic history as shown and described in FIGS. 1 and 2. The exemplary system also includes two helper components C 206, and D 208.

Component A 202 accesses a suitable logic history database 214. The logic history database 214 may be co-located with component A 202, or may be remote therefrom.

As depicted in FIG. 1, a typical request (e.g., incoming call 200) enters the computing system via Front End Component A 202. The incoming call 200 is then routed between appropriate internal components, with a response (e.g., an outgoing call 210) eventually exiting the system.

It is desirable for operators of such systems to have the ability to know exactly how the request traveled through the system, e.g., which logic decision points were taken (or not taken), what the exact sequence of events was, etc. Ideally, as provided by the techniques and technology of the present invention, this is done without any measurable time degradation and for every request.

The present invention presents a unique solution by providing end-to-end, in band tracing of the logic taken by a request. In band refers to the ability to log and maintain a logic trace relating to a routed call data or message within the distributed call system itself, and logged real-time as the relevant call request progresses through each affected component of the distributed call system.

In this example, the incoming call 200 is processed by the front end component 202 which instantiates its logic history in the logic history database 214 and initializes it with its unique identifier A.

As a particular logic is followed, logic codes are added in-band to the logic history maintained in the logic history database 214. This assures that the logic history not only is obtained by information immediately relevant to the call request itself, but it eliminates any delays or failures to match a given request with its history drawn from an out-of-band source, e.g., from inferences made from call data records and such.

Figure 2:
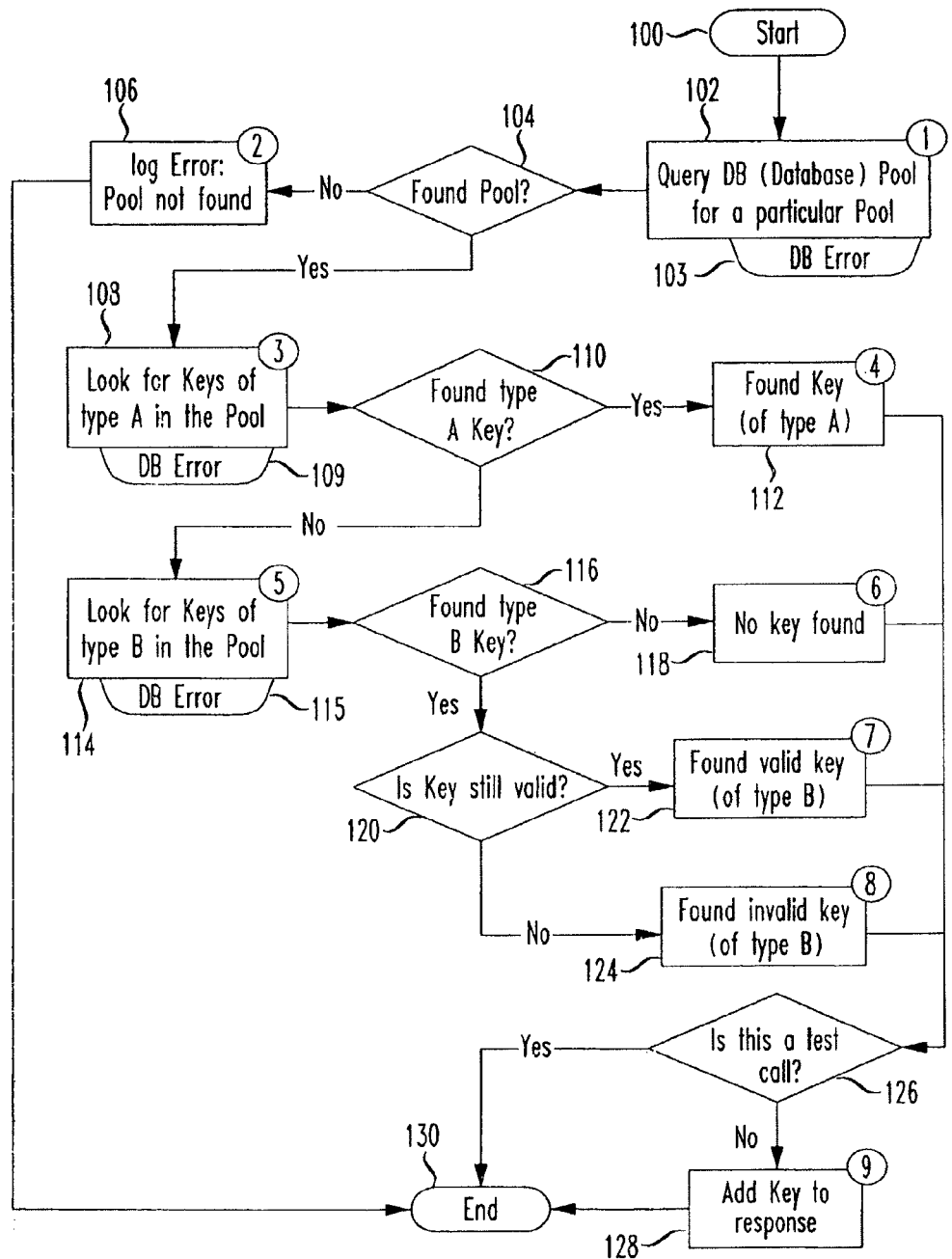
FIG. 2 shows an exemplary logic string through an exemplary system, using an in-band logic history compilation technique implementing distributed logic compilation from within a complex distributed system, in accordance with the principles of the present invention.
Figure 3:
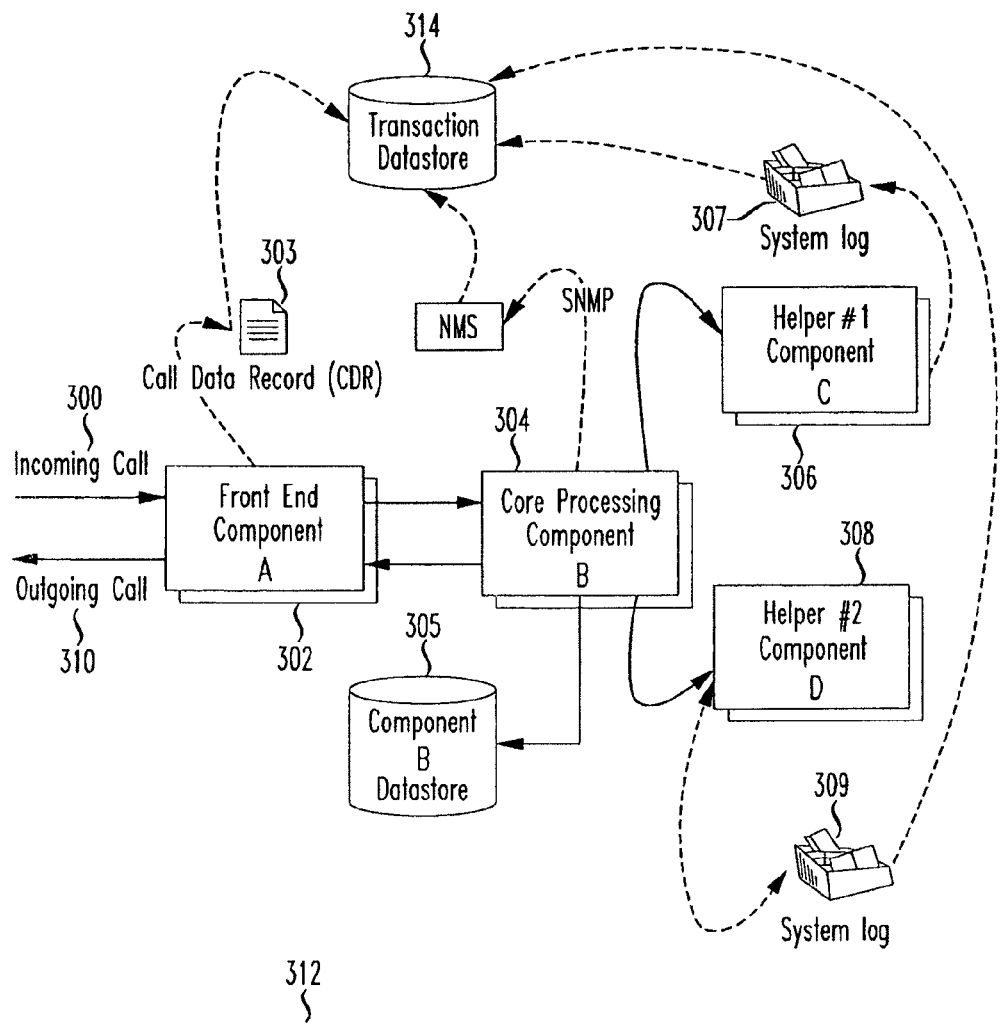
FIG. 3 shows a distributed computing system consisting of an exemplary four components, and use of conventional technology to collect a transaction history.

Continuing on with the given example shown in FIGS. 1 and 2, at some point and time, the front end component A 202 passes the request on to the core processing component B 204. This component B 204 performs database lookups in a suitable Component B datastore 205, thereby adding logic codes to the requests' logic history.

In the given example, Component B 204 then asks for additional processing from two helper components C 206, and D 208.

All of the exemplary Components A 202, B 204, C 206, D 208 start their own logic history, first by initializing it with their unique identifier (in this example B, C, and D) and then by adding on their logic codes. Once a component 202, 204, 206, 208 has completed its processing, it returns its relevant logic history string to the invoking caller (in this case Component A 202), which then embeds the returned string relevant to that component (in this case Components B 204, C 206 and D 208) into its own logic history. In this example, the returned logic history strings from the helper Components C 206, D 208 are embedded in the same logic history added to by the core processing Component B 204, which in turn is all embedded in the logic history originally instantiated (i.e., started) by the front end Component A 202.

The resulting logic history string 212 is a unique presentation of the path travelled by the call request through relevant portions of the distributed call system. Moreover, the logic history is easily and directly available contemporaneous with the call request itself (i.e., it is in-band). Thus, as soon as the call request is completed, the complete end-to-end call history is also complete and available, e.g., from the logic history database 214.

The logic history is easily readable, verified and archived by automated processes 214.

As depicted in the exemplary logic history string 212, logic history is preferably provided in a hierarchal manner. For instance, the logic history provided by components C 206 and D 208 are embedded into the logic history of the logic history provided by component B 204. In turn, the logic performed by component B 204 is embedded into the logic history provided by instantiating component A 202.

The proposed technology provides the ability to log a logic history for every call instance through a distributed computing system. The inventive in-band logic history uniquely traces a call's entire path, end-to-end, in-band within the distributed call system itself. The end result is a single true representation of what occurred with no inference required. Moreover, the in-band logic history is performed with no measurable degradation to overall performance.

The inventive in-band logic history generally provides higher performance than the otherwise conventional technology requiring call logging and post-call gathering of individual constituent parts, and then re-associating the data together to form a best-guess at what logic was actually performed. With a logic history embedded in-band in accordance with the principles of the present invention, there is no longer the conventional need for operational staff to correlate Call Detail Records (CDRs), error logs, SNMP traps etc. to gather what occurred in the system for a particular transaction of interest.

The invention does not force unique logic history codes across the system, which in practice would be brittle. Rather each sub-component that is logic history enabled can use codes that have meaning and applicability only to itself. This allows the system to be flexible and lets sub-components change and redefine their logic and logic history traces without impacting the rest of the system.

FIG. 2 shows an exemplary logic string through an exemplary system, using an in-band logic history compilation technique implementing in-band logic compilation from within a complex distributed system, in accordance with the principles of the present invention.

In particular, as shown in FIG. 2, a distributed computing system in general may consist of, say, N components (with N>=1) affecting a given call request. Each component can be considered as a self-contained computing unit that handles one or more tasks and returns a result. One component may request service from one or more other components within the system.

The exemplary component shown in FIG. 2 performs a database query and retrieves and returns a key. At each logic decision point a uniquely defined identifier is added to an in-band logic history to document the path taken through the code. Because the logic history is in-band, it is created real time within the distributed call system itself.

The uniquely defined identifier is a number in the example, though it may certainly instead be alphanumeric, and/or even textual.

In step 100 shown in FIG. 2, the first task at the entry point to the exemplary component initializes, or instantiates, the logic history. The logic history is preferably instantiated within a suitable logic history database 214, though it can instead be instantiated within the component A 202 itself. The instantiated logic history may be given a unique name relevant to the given particular computing component, e.g. "MyComponent".

In step 102, a lookup is performed in a particular database pool (e.g., the logic history database 214 shown in FIG. 1) to query the database pool for a particular logic history. In the disclosed embodiment, a literal character (e.g., a literal "1") is appended to the logic history at this point.

In step 103, the database lookup in step 102 can throw errors that may terminate the logic flow. In that case the logic history would be complete, and in the given example an indication as to this logic occurrence is indicated, e.g., with a literal "1" in step 102.

On the other hand, the database may report that there is no pool (steps 104, 106) with the desired criteria (whatever they may be). If not, then this logical flow may be documented with a suitable number, character, text, etc. In this example, a literal character (e.g., a "2") would be appended to the logic history (in step 106) to indicate the occurrence of this logic flow to this particular call request, and the logic flow would advance to an end step 130.

Assuming that the logic history has been found in step 102, the logic will now move to step 108 where a lookup for keys of type A is performed to check if they are of a certain type. In this sample there are two types of keys, key type A and key type B. Step 108, if successful, would append an appropriate indicator (e.g., a literal "3") to the in-band logic history. Any error would be reported in step 109.

In the given example, type A keys are the preferred keys and looked up first. In step 110, the flow determines whether or not the key is a type A key. If so, then the process moves to step 112, where action is taken to indicate in the in-band logic history that a type A key was found, e.g., by appending a literal "4" to the logic history.

From step 112, the process moves to step 126 to determine whether or not the call was a test call (important to test the operation and response of 911 emergency systems). If the call was a test call, the process moves to the end step 130.

If not, the process moves to step 128 to add a key to the response depicted in step 128, and then to the end step 130.

Returning to step 110, if the key was not a type A key, then the process moves to step 114, where type B keys are searched for in the pool. If a type B key is found, a literal "5" would be appended to the in-band logic history. Any error would be reported in step 115.

Step 116 determines if a type B key is found. If not, the process moves to step 122 where a found valid key of type B is added to the logic history, then the process moves to step 126. Otherwise, if a type B key is found, step 120 determines if the key is still valid. If the key is still valid, step 122 determines and reports that an invalid type B key was found, and the process proceeds to step 126.

If no Type B key was found in step 116, then the process proceeds to step 118 to appropriately mark the in-band logic history, e.g., with a literal "6" 118 appended to the Logic History. As indicated earlier, the database lookup for the key can throw errors 109, 115 in which case the logic will come to an abrupt end with no further additions to the logic history. On the other hand, if a type B key was found, the logic determines if the type B keys is invalid 120, in which case the literal "8" is appended to the logic history in step 124. If the type B key is valid, a literal "7" will be appended to the logic history in step 122.

At the very end of the logic call flow, the logic does one final check to see if this was a test transaction 126 (which are quite common in distributed systems). Only if this was a real call (i.e., not a test call), step 128 will append a suitable indicator to the in-band logic history, e.g., a literal "9", and the retrieved Key is returned in the response at the end step 130.

In summary, one possible call path through this sample component could be captured as [MyComponent: 1,3,4,9]. We choose to use the comma (,) as a delimiter between logic codes, however any other delimiter would serve just as well. The entire string of logic codes is delimited by a pair of two brackets ([,]). However any other pair of suitable delimiters may be chosen.

While the invention has been described with reference to the exemplary embodiments thereof, those skilled in the art will be able to make various modifications to the described embodiments of the invention without departing from the true spirit and scope of the invention.

What is claimed is:

1. A method, comprising:
   generating, at a given component of a plurality of components comprising one or more computing devices, a given logic history associated with the given component in response to receiving a call request at the given component;
   embedding, at another component of the plurality of components comprising one or more computing devices, another logic history associated with the other component into the given logic history in response to the call request being routed from the given component to the other component; and
   storing the given logic history for the call request in a database, wherein the given logic history characterizes an end-to-end logic flow history of the call request.

2. The method of claim 1, wherein each of the given and another logic history comprises a unique identifier associated with a respective component of the plurality of components.

3. The method of claim 2, wherein each logic code of a plurality of logic codes characterizes an event occurring at a respective component of the plurality of components in response to the call request.

4. The method of claim 2, wherein a given logic code of a plurality of logic codes is independent of the remaining plurality of logic codes.

5. The method of claim 1, comprising:
   identifying a particular logic code associated with a particular component of the plurality of components; and
   querying the database for a particular logic history that includes the particular logic code;
   receiving the given logic history in response to the querying.

6. The method of claim 1, wherein the embedding is conducted substantially in real-time at the other component as the call request is routed to the other component.

7. An apparatus, comprising:
   a given component comprising one or more computing devices, the given component being configured to:
      receive a call request from a network server; and
      embed a given logic code uniquely identifying the given component to a given logic flow history in response to the call request;
   another component comprising one or more computing devices, the other component being configured to:
      receive the call request from the given component; and
      embed another logic code uniquely identifying the other component into the given logic flow history in response to receipt of the call request; and
   a logic history database to receive and store the given logic flow history for the call request, the given logic flow history characterizing unique routing events encountered throughout the call request.

8. The apparatus of claim 7, wherein the given and another logic codes characterize an event occurring at a respective component in response to the call request.

9. The apparatus of claim 8, wherein the given logic code is independent of the other logic code.

10. The apparatus of claim 7, wherein the other logic code is embedded substantially in real-time at the other component as the call request is routed to the other component.

11. The apparatus of claim 7, comprising:
    identifying a particular logic code associated with one of the given and the other component; and
    querying the database for a particular logic history that includes the particular logic code;
    receiving the given logic flow history in response to the querying.

12. The apparatus of claim 7, wherein the given logic code comprises a unique identifier associated with the given component.

13. A method, comprising:
    generating, at a first component of a plurality of components comprising one or more computing devices, a first logic history associated with the first component in response to receiving a call request at the first component;
    embedding, at a second component of a plurality of components comprising one or more computing devices, a second logic history associated with the second component into the first logic history in response to the call request being routed from the first component to the second component; and
    embedding, at a third component of a plurality of components comprising one or more computing devices, a third logic history associated with the third component into the second logic history in response to the call request being routed from the second component to the third component; and embedding, at a fourth component of a plurality of components comprising one or more computing devices, a fourth logic history associated with the fourth component into the second logic history in response to the call request being routed from the third component to the fourth component; and storing the first logic history with the embedded second, third and fourth logic histories for the call request in a database, wherein the first logic history characterizes an end-to-end logic flow history of the call request.

* * * * *